O. F. TORBRON.
TRIPLE VALVE.
APPLICATION FILED JUNE 25, 1909.

965,608.

Patented July 26, 1910.

Inventor
Orin F. Torbron

O. F. TORBRON.
TRIPLE VALVE.
APPLICATION FILED JUNE 25, 1909.

965,608.

Patented July 26, 1910.
5 SHEETS—SHEET 3.

Witnesses
J. S. Freeman.
John A. Donegan.

Inventor
Orin F. Torbron.
By Chandlee & Chandlee
Attorneys.

O. F. TORBRON.
TRIPLE VALVE.
APPLICATION FILED JUNE 25, 1909.

965,608.

Patented July 26, 1910.
5 SHEETS—SHEET 4.

Witnesses

Inventor
Orin F. Torbron,

By

Attorneys

UNITED STATES PATENT OFFICE.

ORIN F. TORBRON, OF BELLVILLE, TEXAS.

TRIPLE VALVE.

965,608.   Specification of Letters Patent.   Patented July 26, 1910.

Application filed June 25, 1909. Serial No. 504,341.

*To all whom it may concern:*

Be it known that I, ORIN F. TORBRON, a citizen of the United States, residing at Bellville, in the county of Austin, State of Texas, have invented certain new and useful Improvements in Triple Valves; and I do hereby declare the following to be a full, clear, and exact description of the invention, such as will enable others skilled in the art to which it appertains to make and use the same.

This invention relates to improvements in fluid pressure brake systems and more particularly to the valve for controlling the admission of air from the main to the auxiliary reservoir and to the brake cylinder.

One object of the present invention is the provision of an improved form of triple valve adapted to assist the engineer's valve in the reduction of pressure in the train pipe during a service application.

Another object is the provision of a triple valve adapted to operate automatically to set the brakes in the event of a burst air hose and the train breaking.

A further object is the provision of a triple valve provided with a means for positively preventing the escape of air from the auxiliary reservoir to the atmosphere in the event of the train breaking in two or when the air hose bursts.

A still further object is the provision of a means for regulating the release of the brakes in such manner that the brakes on the forward cars in a long train will be released simultaneously with the brakes on the rear cars, thus preventing "breaking".

With these and other objects in view as will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size and minor details of the device may be made without departing from the spirit or sacrificing any of the advantages of the invention.

In the accompanying drawings forming part of the specification.

Similar numerals of reference are employed to designate corresponding parts throughout.

Figure 9:
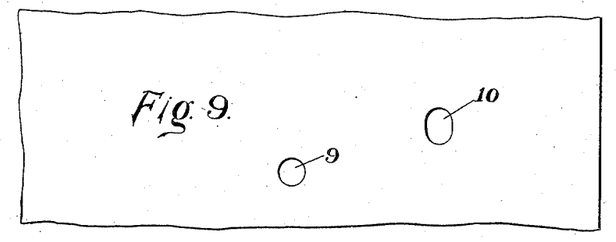
Fig. 9 is a fragmentary plan view of the valve seat.
Figure 10:
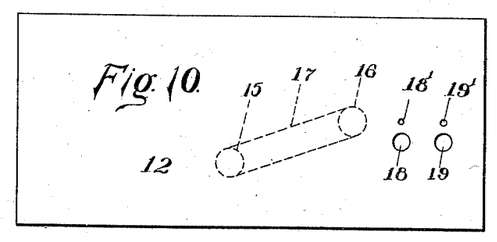
Fig. 10 is a bottom plan view of the main valve.
Figure 11:
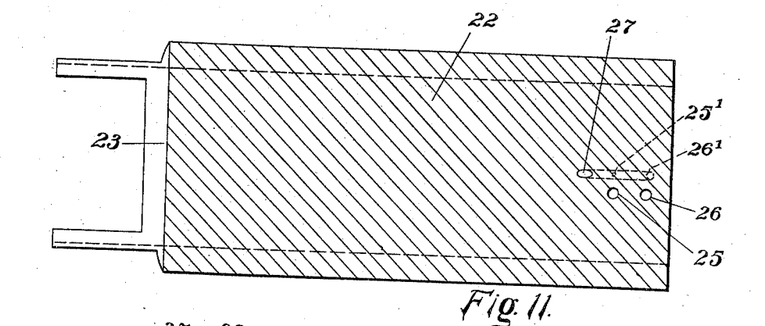
Fig. 11 is a sectional plan view of the graduating valve taken on the line 11—11 of Fig. 1.
Figure 12:
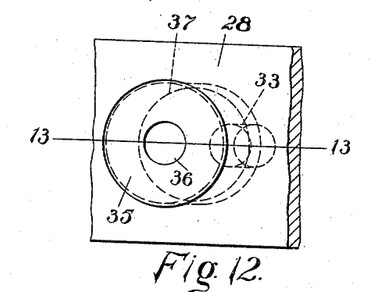
Fig. 12 is an enlarged fragmentary plan view taken adjacent the right hand end of Fig. 7.

The valve casing is designated in general by the numeral 5 and at its forward end is provided with a removable cap or bonnet 6, which when removed gives access to the interior of the casing for cleaning purposes. The train pipe port is designated by the numeral 7 and is located in the upper side of the casing 5 and adjacent its forward end. The lower side of the casing is channeled as shown at 8, this channeled portion extending throughout the length of the casing and constituting a valve seat. The ports leading to the brake cylinder and the atmosphere are located in the valve seat, the exhaust port 9 being arranged at the middle of the valve seat, or approximately so, and the port to the brake cylinder designated by the numeral 10, located at the rear end of the casing and oblique to the exhaust port 9. The port 10 is oval in contour as clearly shown in Fig. 9 for a purpose to be described later. The rear end of the casing 5 is open and connects with the tubing leading to the auxiliary reservoir and formed on the lower side of the front end of the casing is a vertical wall 11, which rises to a point adjacent the longitudinal axis of the casing.

Slidingly fitted in the valve seat 8 is what will subsequently be termed a main valve 12. This member is considerably less in length than the length of the valve seat and is provided at either end and on its upper face with a pair of up-standing lugs or ears 13 and 14. Formed in the lower face of the main valve 12 are a pair of ports 15 and 16 which correspond in size to the exhaust and brake cylinder ports 9 and 10 and the space between their centers is exactly the same as the space between the centers of the exhaust and brake cylinder ports. These ports are so arranged that when the main valve is moved to one position they will register with the exhaust and brake cylinder ports, and formed in the body of the main valve 12 is an oblique passage 17 which connects the ports 15 and 16.

The main service port of the main valve is designated by the numeral 18 and is located between the rear end of the main valve and the rear most port 16. The main emergency port of the main valve is designated by the numeral 19 and is somewhat larger than the service port and is arranged between the service port 18 and rear end of the main valve and spaced from the service port 18. It is to be understood that the service and emergency ports lie in parallel vertical planes and extend through the upper and lower faces of the main valve 12. The auxiliary service and emergency ports are designated by the numerals 18' and 19'. These ports are considerably less in diameter than the main ports and are to each other in diameter as the said main ports. The auxiliary service port is located to one side and spaced from the main service port, the distance between their centers corresponding approximately to the length of the oval brake cylinder port 10, so that when the main valve is moved to one position the main and auxiliary service ports will register with the brake cylinder port 10. The auxiliary emergency port 19' is arranged to one side and spaced from the main emergency port 19 so that when the main valve is moved to emergency position the main and auxiliary emergency ports will register with the brake cylinder port 10.

The piston is designated in general by the numeral 20 and slidingly fits within the casing 5. As shown, this member consists of a head portion 21, the periphery of which bears on the inner face of the upper half of the casing 5. The head 21 constitutes the upper half of the piston, while the lower half 22 constitutes what will subsequently be termed a graduating valve. The periphery of the graduating valve bears on the lower half of the casing 5 and on its lower side is flattened and bears on the upper face of the main valve 12. The opposite faces of the graduating valve 22 extend forwardly and rearwardly as shown at 23 and 24. With these rearward extensions 23 and 24 the length of the lower face of the graduating valve is increased to a length a trifle less than the main valve 12, upon which the graduating valve bears. The extensions 23 and 24 extend downwardly and incline in opposite directions from the lower end of the head or upper portion 20 of the piston. With this construction it is obvious that the contour of the graduating valve is substantially triangular in longitudinal section as shown in Figs. 1 to 4 inclusive, with the piston head 20 arranged at the vertex of the graduating valve.

The main service and emergency ports of the graduating valve are designated by the numerals 25 and 26 and lie in vertical parallel planes and are disposed adjacent the terminal of the rear inclined side 24. These ports correspond in diameter to the diameters of the main service and emergency ports of the main valve and the space between their centers corresponds exactly with the space between the main service and emergency ports 18 and 19 of the main valve 12. The auxiliary service and emergency ports are designated by the numerals 25' and 26' and lie in vertical parallel planes and located to one side of the main ports 25 and 26, and are adapted to register with the auxiliary service and emergency ports of the main valve at the same time the main ports 25 and 26 register with the main ports 18 and 19.

The relative lengths of the main valve 12 and graduating valve 22 is such that when the forward end of the graduating valve abuts against the lugs 13 of the forward end of the main valve 12 the service and emergency ports 25 and 26 will be in alinement with the service and emergency ports 18 and 19 of the main valve 12. As before stated, the length of the graduating valve is a trifle less than the length of the main valve 12 so that when the rear end of the graduating valve abuts against the rear lug 14 at the rear end of the main valve the service and emergency ports 18 and 19 of the main valve will be closed by the blank space between the main service and emergency ports 25 and 26 of the graduating valve and body of the graduating valve.

By referring now to Figs. 1 to 4 inclusive it will be seen that communication between that portion lying in advance of the piston 20 and auxiliary service and emergency ports 25' and 26' is established by means of a passage 27. The passage 27 extends through the body of the graduating valve 22, its upper end lying directly beneath the lower end of the piston head 20 and its lower end terminating in the auxiliary emergency port 26' of the graduating valve and passing through the upper end of the auxiliary service port 25' of the graduating valve. It might here be stated that the auxiliary service and emergency ports 25' and 26' do not extend completely through the graduating valve, like the main ports 25 and 26, but terminate in the passage 27.

By referring now to Figs. 1 to 4 inclusive it will be seen that the graduating valve 22 carries what will subsequently be termed an emergency rod 28. This member extends longitudinally of the casing 5 and is slidingly fitted in an opening formed through the middle of the graduating valve 22. The emergency rod 28 is a trifle greater in length than the graduating valve 22 and beyond its rear end or that end extending through the extension 24 is provided with an enlarged boss or head 29, the forward end of which is inclined to conform with the face of the wall and serves to limit movement of the emergency rod in one direction by bearing against the face of said wall. The forward end of the emergency rod 28 or that extending through the forward extension 23 is provided adjacent its free end with a flange 30 which is fixedly secured to the rod, and encircling the rod and having its opposite terminals bearing on the forward extension 23 and rear face of the flange 30 is a coil spring 31, the function of which is to yieldingly hold the boss or head 29 in engagement with the rear extension 24.

Extending diagonally of the emergency rod 28 is what will subsequently be termed an auxiliary port 32. The port is so arranged that when the boss 29 bears on the rearward extension 24 as before described, the auxiliary port will be in axial alinement with the passage 27.

By referring now to the drawings it will be seen that the emergency rod 28 is provided with an emergency port 33. This 27, whereby the volume of air entering the upper end of the passage 27 will be materially decreased, by virtue of the small diameter of the auxiliary port 32, before it reaches the lower end of the passage 27.

By referring now to the drawings it will be seen that the emergency rod 28 is provided with an emergency port 33. This member is disposed in advance of the auxiliary port 32 and is parallel with the latter. The upper end of the emergency port 33 terminates in an enlarged seat 34, extending downwardly from the upper face of the emergency rod 28, and surrounding the upper end of the seat 34 is a closure plate 35, which is spaced from the floor or bottom of the seat 34. The closure plate is centrally provided with an opening 36 and disposed within the seat and between the closure 35 and floor of the seat is a plate 37, the diameter of the plate 37 is considerably less than the diameter of the seat 34 but considerably greater than the central opening 36 in the top or closure 35.

Figure 8:
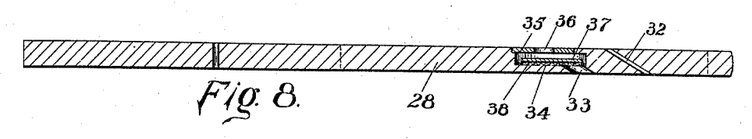
Fig. 8 is a longitudinal sectional view of the same.
Figure 13:
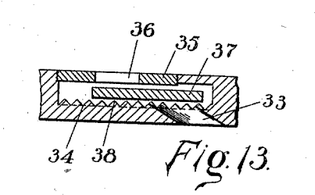
Fig. 13 is a longitudinal sectional view taken on the line 13—13 of Fig. 12.
Figure 14:
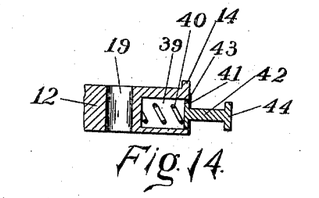
Fig. 14 is a fragmentary longitudinal section of the main valve.
Figure 15:
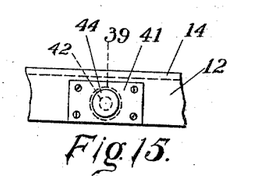
Fig. 15 is a fragmentary end view of the same.

By referring now to Figs. 8 and 13 it will be seen that the floor of the seat 34 is corrugated as shown at 38. The plate normally bears on the corrugated surface of the seat and when in this position it can be readily seen that air passing through the opening 36 will not be prevented from passing through the emergency port 33, by virtue of the plate 37 being of less diameter than the seat whereby the air will pass between the edge of the plate and wall of the seat and between the corrugations and into the emergency port 33. When the plate is raised, however, from the corrugated floor of the seat it will seal the opening 36 in the top or closure 35, whereby air will be prevented from passing upward through the emergency port 33. With this construction it is obvious that the plate 37 performs the function of a check valve.

By referring now to Figs. 1 to 4 inclusive it will be seen that the rear end of the main valve 12 is provided with a chamber 39 and disposed within the chamber 39 is a helical spring 40. The outer end of the chamber 39 is provided with a cap or closure 41, having a central opening in axial alinement with the chamber. Slidingly fitted within the cap or closure 40 is a plunger rod 42, the inner end of which is provided with an enlarged head 43 which bears on the outer terminal of the helical spring 40 while its outer end is provided with a similar head 44, the function of which will appear later.

The casing 5 on its upper side, is provided with a feed duct 45, arranged on the inner face and at approximately the middle of the casing. The floor of the duct inclines outwardly as shown at 46, the highest point of the floor being at the forward end of the duct. This duct is for the purpose of establishing communication between the train pipe and auxiliary reservoir and the function of its inclined floor will appear later.

Figure 1:
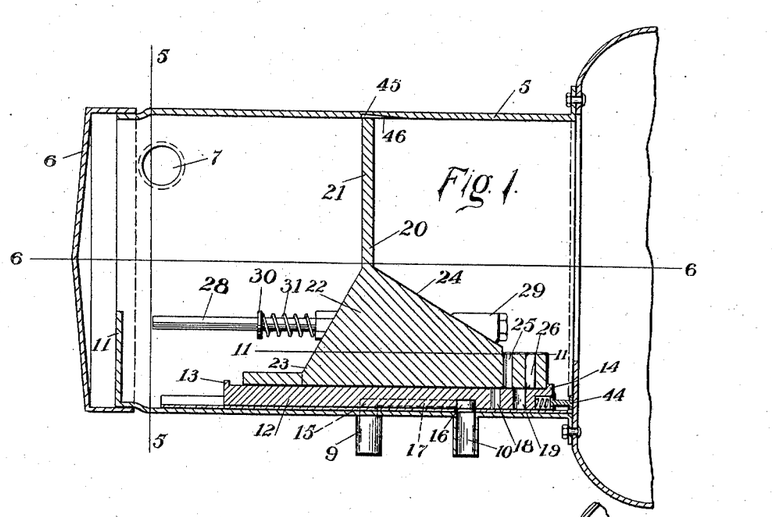
—Figure 1 is a longitudinal sectional view of the device showing the parts in full release and in position to charge the auxiliary reservoir.

Having now described the construction of the device the operation will be given. In Fig. 1 the parts are shown set in full release position and it will be seen that the piston head 20 under-lies the intermediate portion of the feed duct 45, thus placing the auxiliary reservoir in communication with the train pipe, while in this position the main valve 12 is moved rearwardly until the rear-most head 44 of the plunger rod 42 bears on the forward end wall of the auxiliary reservoir and the graduating valve 22 has its rear end bearing on the rear end lug 14 of the said main valve, thus placing the main service and emergency ports 25 and 26 and the auxiliary service ports 25' and

26' at its rear end out of registration with the main emergency port and main service ports 19 and 18 and auxiliary emergency and service ports 19' and 18' of the main valve. It will be observed that the main and auxiliary ports of the main valve are now over that portion of the valve seat 8 between the port 10 leading to the brake cylinder and rear end of the valve casing, thus placing the auxiliary reservoir and brake cylinder out of communication. It will be noticed however, when the parts are in this position that the ports 15 and 16 formed in the main valve in advance of the service port 18 are in registration with the ports 9 and 10, and it will be remembered since the port 10 leads to the brake cylinder and the port 9 to the atmosphere that the air in the brake cylinder will now exhaust into the atmosphere. This will be the position of the parts during the exhaust and when charging the auxiliary reservoir.

Figure 2:
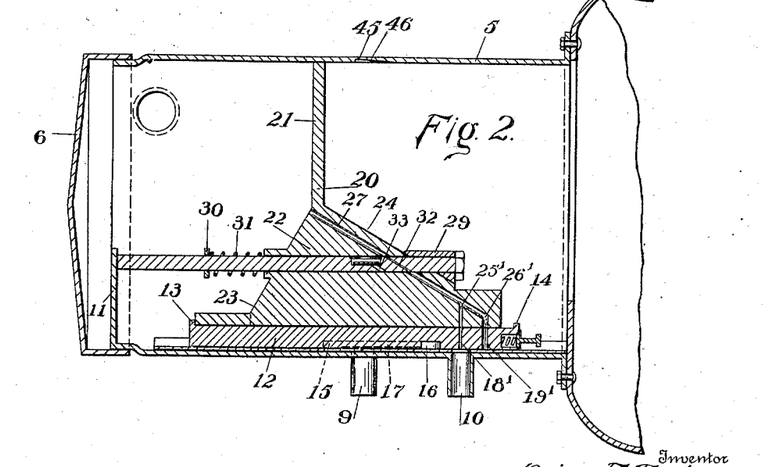
Fig. 2 is a similar view showing the parts in position for a service application.

After the pressure in the auxiliary reservoir equals that in the train line and it is required to make a service application, the reduction of pressure in the train line is made by the engineer's valve in the usual manner and the excess pressure in the auxiliary reservoir will move the piston and its parts to the positions shown in Fig. 2. By reference now to the last-named figure it will be seen the graduating valve 22 has moved forwardly until its forward end bears against the forward lug 13 on the main valve 12, thus placing the main service and emergency ports 25 and 26 and the auxiliary service and emergency ports 25' and 26' in registration with the main and auxiliary service and emergency ports of the main valve. It will be seen that the forward end of the emergency rod 28 bears against the vertical wall 11 at the front end of the casing 5, but not sufficient to compress the helical spring 31 surrounding the said emergency rod. It will be further observed that although the main and auxiliary emergency ports of the graduating valve and main valve are in registration still these ports do not register with the brake cylinder ports 10, but the main service ports 25 and 18 and the auxiliary service ports 25' and 18' of the slide and main valve arranged immediately in advance of the emergency ports are in registration with the port 10 to the brake cylinder. It will be observed that during the movement of the piston its upper end has moved to a position in advance of the feed duct 45, thus cutting off communication between the train line and auxiliary reservoir and this forward movement of the piston and graduating valve 22 has carried the main valve 12 forwardly also until the ports 15 and 16 of the latter are now out of registration with the ports 9 and 10 leading to the brake cylinder and atmosphere, thus permitting the air from the auxiliary reservoir to pass through the emergency port 25 and through the service port 18 of the main valve and through the port 10 and into the brake cylinder where the parts are operated to apply the brakes in the usual manner. When the parts are so positioned it will be seen that communication between the brake cylinder and train line is established by means of the passage 27, and auxiliary service ports 25' and 18'. Thus when the required reduction is made in the train line to bring the parts to the position just described, it will be seen that instead of exhausting into the atmosphere to cause the required reduction, as frequently done, a portion of the air from the train line will pass into the brake cylinder through the passage 27, thus making it possible to utilize a portion of the air which was formerly exhausted into the atmosphere to cause the required reduction in the train line. It will be further observed that owing to the relatively small diameter of the auxiliary port 32 that the volume entering through the passage 27 will be considerably reduced so as not to cause back pressure on the auxiliary reservoir.

Figure 3:
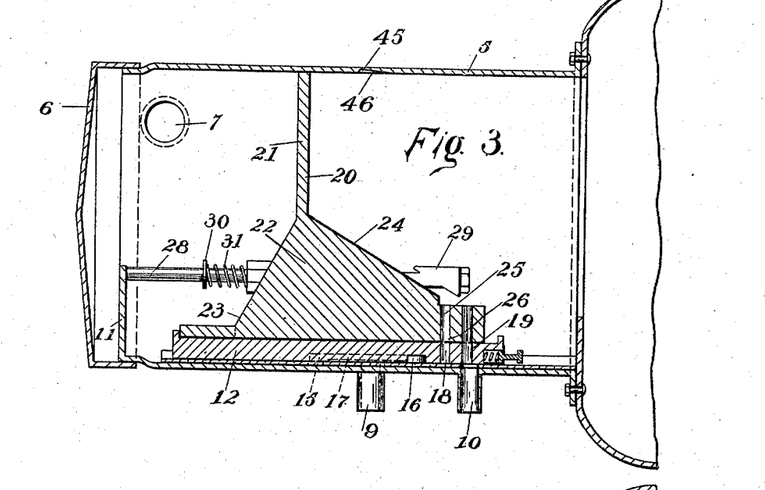
Fig. 3 is a similar view but showing the parts set for an emergency application.

Fig. 3 shows the position of the parts during an emergency application since it is well known to those skilled in the art that the usual method of applying an emergency application consists in creating a greater reduction in the train line than for a service application, a detailed description of the operation will not be necessary.

By referring now to Fig. 3 it will be seen that owing to the great reduction in the train line the pressure in the auxiliary reservoir has forced the parts farther forward than during the service application. It will be remembered that during the service application the forward end of the emergency rod 28 bore on the vertical wall 11, but not sufficient to compress the helical spring 31. When the excessive reduction is made however and the air in the auxiliary reservoir forces the piston farther forward the spring 31 will be compressed and the graduating valve moved over the rod until the auxiliary port 33 in the rod is in registration with the passage 27. During this forward movement of the graduating valve, the main and auxiliary service ports 25 and 25' of the graduating valve and the main and auxiliary service ports 18 and 18' of the main valve have moved forwardly and out of registration with the port 10 leading to the brake cylinder, thus placing the latter port in registration with the main and auxiliary emergency ports 26 and 19 and 26' and 19' of the graduating and main valves. Owing to the diameters of the latter ports being relatively greater than the diameters of the service ports, a larger volume of air will pass from the auxiliary reservoir to the brake cylinder and by virtue of the auxiliary port 33 in the emergency rod 28 being relatively larger than the auxiliary port 32 in the said rod a larger volume of air will flow through the lower end of the passage 27 and into the brake cylinder through the main emergency ports 26′, 19′ and brake cylinder port 10. This will be the position of the parts throughout the emergency application. It might here be stated that when a great and sudden reduction takes place in the train line caused by other means than the engineer's valve, such as a bursted air hose or train breaking in two the piston and valves will occupy the position shown in Fig. 3, stated the emergency position, thus permitting a relatively large quantity of air to rush into the brake cylinder and apply the brakes. It will now be observed after the brake cylinder and auxiliary reservoir are under equal pressure that the natural tendency of the air will be to rise through the passage 27 and escape through the train pipe port 7 and into the atmosphere. In order to overcome this escape the check valve 37 is set in operation. As before stated, this valve is so arranged that air can pass down through the passage 27, and through the auxiliary port 33 but when pressure is applied to the opposite face of the valve, such as by air rising through the passage 27 the valve 37 will be raised from its position on the floor of the seat and completely cover the central opening 36 in the cap or closure 35, thus positively preventing the escape of air from the brake cylinders into the atmosphere. This construction will be found very advantageous on roads where steep grades occur, and where it often happens a pipe bursts when the train is going down or up grade. It will be seen with this construction that when a hose bursts or a train breaks in two the emergency application will be immediately applied, and the brakes held in contact with the wheels of the cars until the pressure in the train line is again made equal to that in the auxiliary reservoir and brake cylinder.

Figure 4:
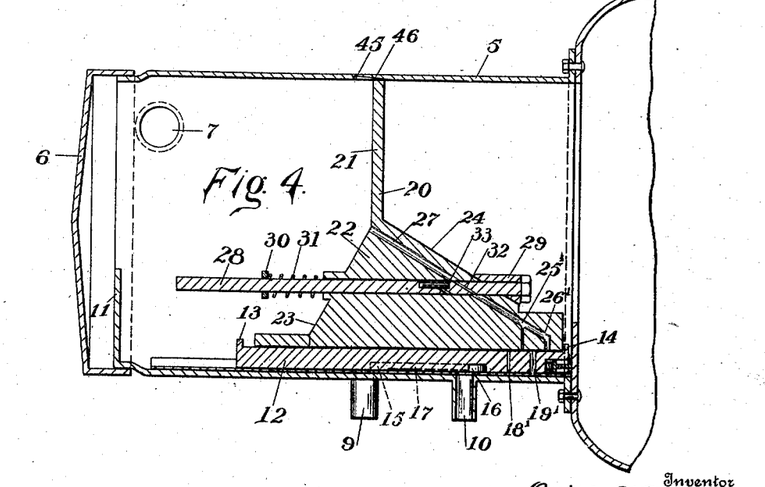
Fig. 4 is a similar view showing the parts in retarded release position.
Figure 5:
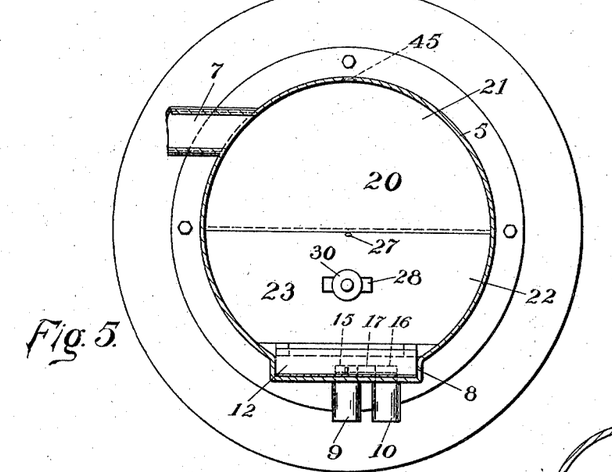
Fig. 5 is a sectional end elevation taken on the line 5—5 of Fig. 1.
Figure 6:
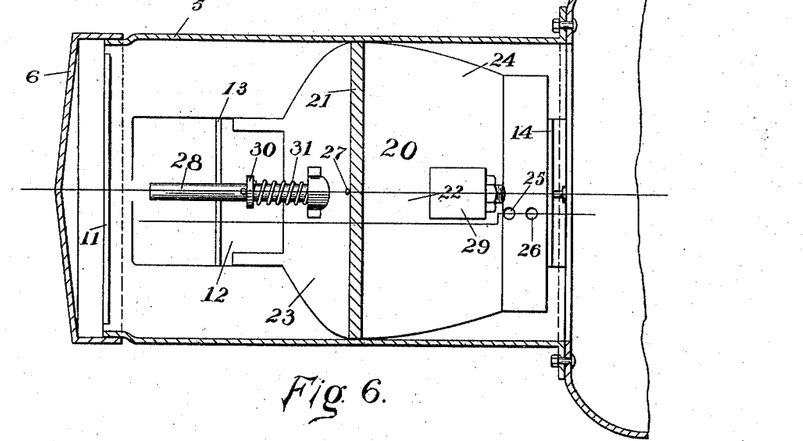
Fig. 6 is a sectional plan view taken on the line 6—6 of Fig. 1.
Figure 7:
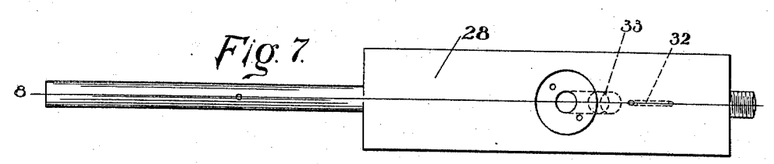
Fig. 7 is a detailed plan view of the emergency rod.

In Fig. 4 the parts are shown in what is known as retard release position. In this connection the brakes on the forward cars in a long train, will be released at substantially the same time as the brakes on the rear cars, whereby what is known as "buckling" will be prevented. In order to carry out this operation a relatively high pressure is suddenly created in the train pipe. This of course will be regulated by the engineer's valve and its admission into the train pipe will force the pistons, graduating valves and main valves on the forward cars rearward to their full extent. It will now be seen by referring to Fig. 4 that the length of the main valve 12 is such that when it is carried rearwardly to its full extent by the movement of the graduating valve 22 the helical spring 40 in the chamber 39 will be compressed by the plunger rod 42, it being understood that the outer head 44 of the latter will at this time be bearing on the forward end of the auxiliary reservoir. After the spring 40 in the chamber 39 has been compressed to its full extent the outer head 44 of the plunger rod will bear on the cap or closure 41 of the chamber 39 and further rearward movement of the piston, graduating and main valves will be prevented. When the parts are in this position the forward ends of the ports 15 and 16 will over-lie the rear ends of the ports 9 and 10, thus presenting a smaller opening through which the air escapes than when the first-named ports are in direct alinement with the last-named ports, as clearly shown in Fig. 4. It will also be observed when the parts are in this position the piston head 20 will under-lie the rear end of the feed duct 45 and owing to the incline of the latter a smaller opening will be presented for the air to pass through from the train pipe than when the piston head under-lies the forward end portion of the duct 45. It will be evident when the pressure is increased in the train line to force the parts into this position the valves on the forward cars will be the first affected and owing to the small opening presented for the escape of air from the brake cylinder, the working parts in the latter will move to release position very slowly and it will be further observed that the small opening formed by the piston and feed duct will permit only a small volume of air to enter the auxiliary reservoir, thus retarding the charging of the latter with a pressure equal to the pressure in the train line. Thus it can be seen when it is desired to apply the brakes in a long moving train in order to check the speed of the latter and then to suddenly release the brakes, the reduction is first made in the train line in the usual way; after the speed has been checked to the required degree the pressure in the train line is increased a certain number of pounds greater than in the auxiliary reservoir, and enough to force the graduating and main valves rearwardly and compress the spring 40, as before described. The number of pounds increase may be for example 15, therefore this 15 pounds will be exerted on the valve on the fore-most car while the increase in the valve in the next succeeding car will be a fraction less and so throughout the length of the entire train, the valves of the rear-most cars, owing to the relatively low pressure, moving to only full release as shown in Fig. 1. By the time the valves in the rear-most cars have moved to full release the pressure in the valves in the forward cars will be reduced to enable the pressure in the auxiliary reservoir to move the said forward valves to full release, thereby accomplishing a simultaneous release of all the brakes.

It will be observed that after a service application has been made and the pressure in the auxiliary reservoir falls below that in the train line, the main valve will not move when going to lap with the graduating valve, this effect is brought about in the following manner:—As before stated, the main valve supports the graduating valve and the two are preferably formed of the same material, now it will be observed that the main valve is supported on the valve seat 8 and the lining or bushing of this seat is preferably Babbitt or an analogous composition whereby the frictional co-efficient between the graduating valve and its seat will be different to the frictional co-efficient between the graduating and main valves, thus it can be seen that owing to the relatively soft metal with which the seat 8 is lined more force will be required to move the main valve on its bearing surface than the graduating valve on the bearing surface of the main valve. Therefore it will be seen when the parts are in position shown in Fig. 2 and the pressure in the train line rises above that in the auxiliary reservoir due to the air in the latter expending itself into the brake cylinder, the parts will go to lap position, or in other words the piston and graduating valve 22 will move rearwardly on the graduating valve 12 until the rear end of the graduating valve abuts against the rearmost lug 14 of the main valve, thus blanking the ports. It will be further observed when the parts are in this position that the air pressure on the forward end of the main valve 12 will aid in holding said valve stationary within its seat. This will be the position of the parts until release is intended which is accomplished in the manner before described.

From the foregoing it can be seen that I have provided a valve which is exceedingly simple in structure and comparatively inexpensive to manufacture, embodying few parts and these so arranged that the danger of derangement will be reduced to a minimum.

Having thus described my invention what is claimed as new, is:—

1. In a fluid pressure brake system the combination with a train pipe, auxiliary reservoir, brake cylinder and triple valve; of a device combined with the graduating valve of the triple for shutting off communication between the brake cylinder and atmosphere when the train pipe is disconnected from the main reservoir.

2. In a fluid pressure brake system the combination with a train pipe, auxiliary reservoir, triple valve and brake cylinder; of a valve rod connected with the graduating valve of the triple and having passages of unequal diameters, whereby unequal volumes of air from the train pipe may be delivered into the brake cylinder during the application of the brakes.

3. In a fluid pressure brake system the combination with a train pipe, triple valve, auxiliary reservoir and brake cylinder; of a valve device controlled by the pressure in the auxiliary reservoir and train pipe, whereby unequal volumes of air from the latter may be delivered into the brake cylinder during the application of the brakes.

4. In a triple valve, the combination with a train pipe, auxiliary reservoir and brake cylinder; of a graduating valve and an apertured rod combined with the graduating valve, said rod having a passage for delivering air from the train pipe to the brake cylinder, whereby the reduction of pressure in the train pipe is accelerated during the application of the brakes.

5. In a triple valve, the combination with a train pipe, auxiliary reservoir and brake cylinder; of a recessed graduating valve operated by the pressure of the auxiliary reservoir and a rod combined with the graduating valve and having a recess yieldingly held in alinement with the recess of the graduating valve for delivering air from the train pipe into the brake cylinder, whereby the reduction of pressure in the train pipe is accelerated when applying the brakes.

6. In a triple valve, the combination with a train pipe, auxiliary reservoir and brake cylinder; of a recessed graduating valve, having a valved controlled passage yieldingly held in alinement with the recess of the graduating valve and adapted to deliver air from the train pipe to the brake cylinder and further adapted to prevent the escape of the air from the brake cylinder to the atmosphere when the train pipe is disconnected from the triple valve.

7. In a fluid pressure brake system, the combination with a train pipe, triple valve, auxiliary reservoir and brake cylinder; of a graduating valve, a rod connected with the graduating valve and movable relatively to the said graduating valve, said valve rod having passages, whereby air from the train pipe may be delivered in unequal volumes and at different velocities into the brake cylinder during the application of the brakes.

8. In a fluid pressure brake system, the combination with a train pipe, auxiliary reservoir, triple valve and brake cylinder; of a main valve located in the triple valve, said main valve having passages to establish communication between the brake cylinder, auxiliary reservoir and train pipe and a graduating valve supported by the main valve and operable by the pressure in the auxiliary reservoir and train pipe to move in advance of the main valve, said graduating valve having passages communicating
5 with the train pipe and auxiliary reservoir and adapted to be brought into registration with the passages of the main valve.

In testimony whereof, I affix my signature, in presence of two witnesses.

ORIN F. TORBRON.

Witnesses:
   C. C. GLENN,
   ED. BATLA.